United States Patent [19]

Mullen et al.

[11] Patent Number: 4,983,947

[45] Date of Patent: Jan. 8, 1991

[54] COMBINATION ILLUMINATED ENTRY/SECURITY ALARM DISARM SWITCH SYSTEM

[75] Inventors: James E. Mullen, Livonia; James S. Jurkiewicz, Mt. Clemens, both of Mich.

[73] Assignee: Chyrsler Corporation, Highland Park, Mich.

[21] Appl. No.: 474,871

[22] Filed: Feb. 5, 1990

[51] Int. Cl.5 ............... B60R 25/10; B60R 25/00
[52] U.S. Cl. .................... 340/426; 340/542; 340/547; 307/10.2; 307/10.3; 70/57.1; 70/DIG. 49; 200/61.64; 200/61.85; 200/61.93
[58] Field of Search ............ 340/426, 541, 542, 543, 340/547; 307/9.1, 10.1, 10.2, 10.3; 70/57.1, 91, 254, 284, 285, DIG. 49, 379 R, DIG. 51; 200/61.62, 61.64, 61.67, 61.85, 61.93

[56] References Cited

U.S. PATENT DOCUMENTS

| | | | |
|---|---|---|---|
| 3,936,673 | 2/1976 | Kelly et al. | 340/426 |
| 4,546,266 | 10/1985 | Zenick et al. | 307/10.2 |
| 4,635,035 | 1/1987 | Ratzabi | 340/542 |
| 4,803,467 | 2/1989 | Peters | 200/61.64 |
| 4,855,710 | 8/1989 | Kikuchi et al. | 307/10.3 |

Primary Examiner—Donnie L. Crosland
Attorney, Agent, or Firm—Wendell K. Fredericks

[57] ABSTRACT

A combination illuminated entry and door lock switch for a vehicle door lock assembly which provides voltage signals to a single wire bus and smart sensor multiplex control system for controlling turning on interior lights of the vehicle when a door handle is operated and for disarming a vehicle alarm system when a door key is turned in a door lock cylinder. Another embodiment includes a keyboard mounted in a cavity of the door handle assembly which permits sending voltage signals over the single wire bus to the smart sensor multiplex control system to control a variety of drivers and other control devices.

6 Claims, 6 Drawing Sheets

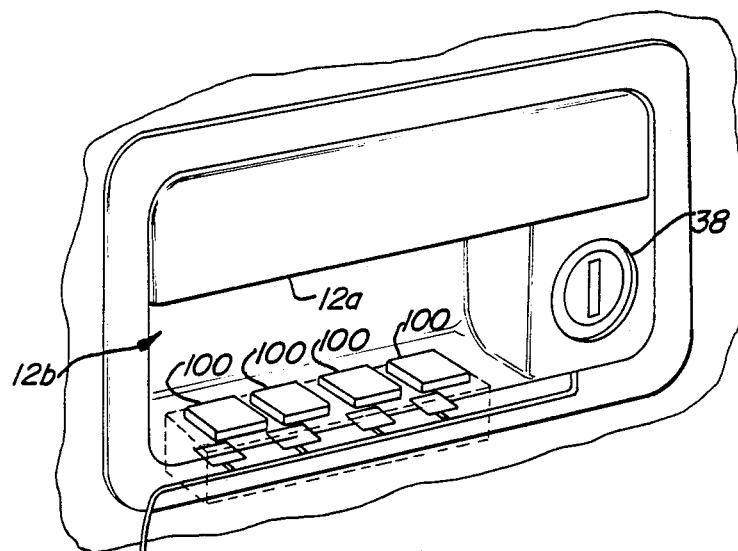
*Fig-5*
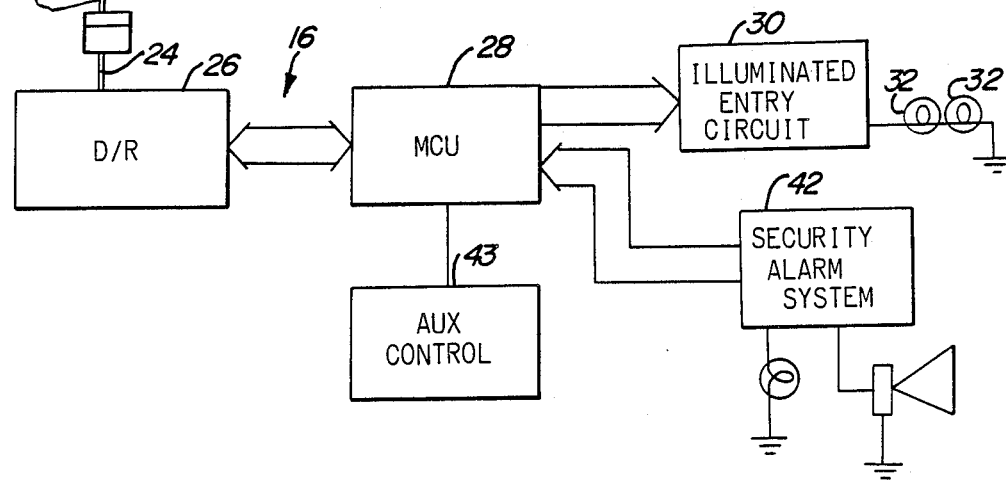
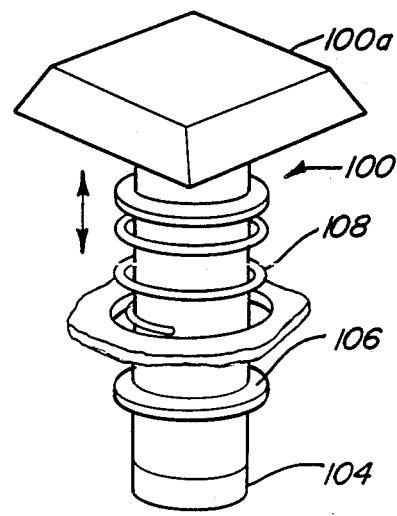
*Fig-6*
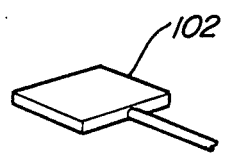

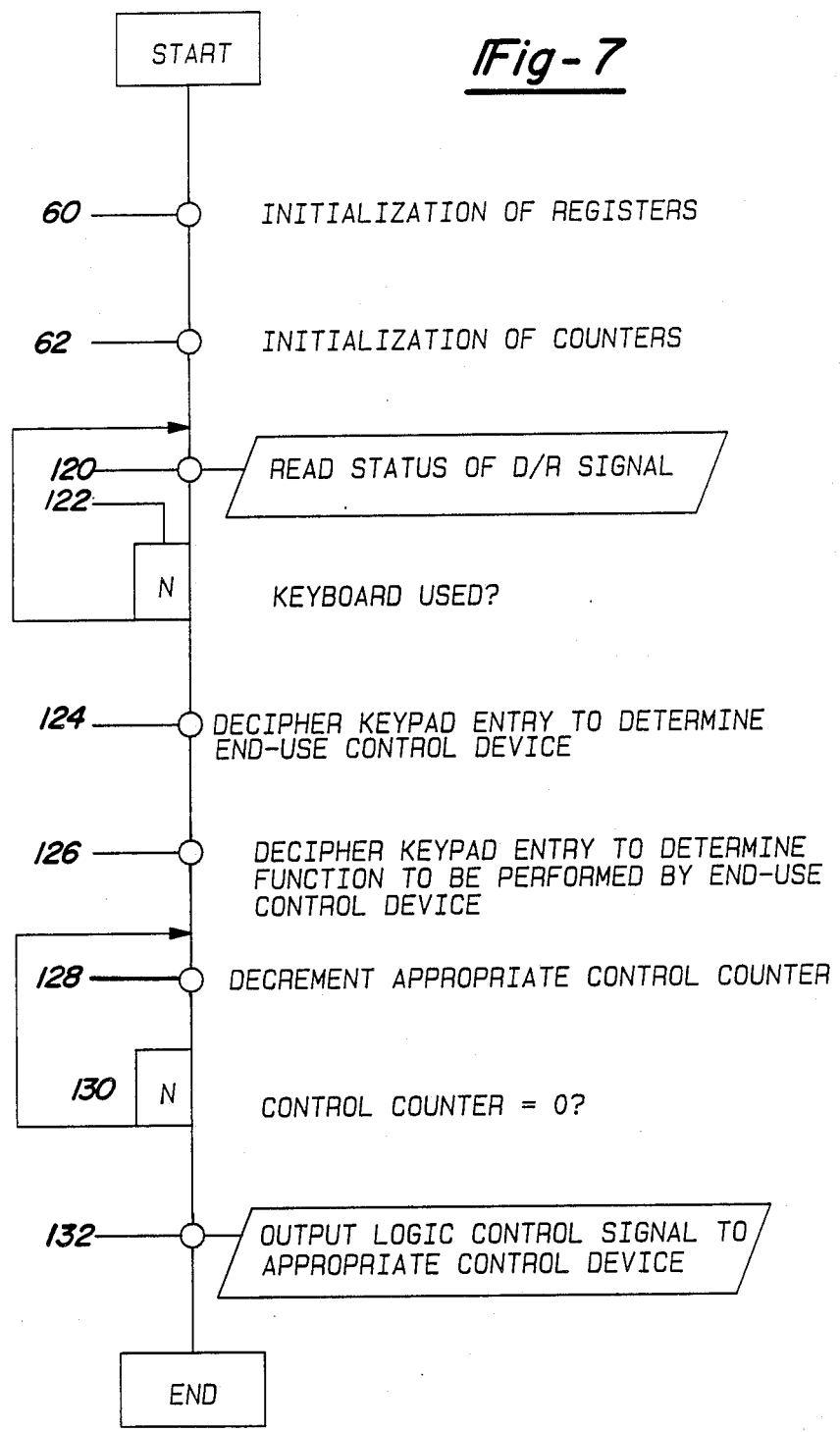

COMBINATION ILLUMINATED ENTRY/SECURITY ALARM DISARM SWITCH SYSTEM

BACKGROUND OF THE INVENTION

1. Field of the Invention

This invention pertains to vehicle door handles and, in particular, to a door handle that includes a combination illuminated entry/security alarm disarm switch assembly.

2. Prior Art

In some motor vehicles employing an illuminated entry light system, the door handle assembly usually includes a normally open plunger-type switch to operate the interior lights. Such lights usually mount on a door panel and/or in the vehicle's ceiling. These lights receive battery voltage when the switch operates.

The switch operates during transition of the handle from a rest position to a door release position. During the transition of the handle, battery voltage routes through a door wiring harness through the contacts of the plunger switch to a control circuit which usually includes a relay which activates to turn on the interior lights. The return leads of the lights connect to a ground post.

The plunger of the switch mounts to the handle pull lever and, during handle transition, the pull lever pushes the plunger downward in such a way as to close the switch contacts.

If the vehicle comes equipped with a security alarm system, usually another switch, a two position disarm switch, mounts on a rear surface of a key cylinder of the door handle assembly for disarming the security alarm system from an armed state.

With some security alarm systems using a disarming switch attached to the key cylinder, arming of the security alarm system requires performing activities not requiring the use of the key cylinder. To place one type of security alarm system in an "armed" state, locking driver and front passenger doors without a key will accomplish it. If you want to by-pass arming the system, then lock the driver or passenger door by using the key.

Rotating the key in the door cylinder not only rotates a latch mechanism which unlocks the door but, at the same time, rotates the two-position rotary switch to a position which applies a "disarm" signal (a ground voltage) to the security alarm system. This "disarm" signal routes through closed contacts of the rotary switch over a harness to an input port of the security alarm system. Normally, the alarm system input port looks for a "stay armed" (high voltage) level signal which maintains the alarm system activated. When the "disarm" signal enters the input port, the alarm system goes into a "disarmed" state.

The door handle assembly, with the illuminated entry switch and disarm switch ("add-ons") attached, usually causes, at the assembly plant, a need to provide separate right and left hand switches, both illuminated entry and disarm switches for the driver and passenger doors of each vehicle, both with separate wiring. Also the size and shape of these switches may vary from one model vehicle to another due to door handle linkage mechanism, shape differences in key cylinder structure, as well as these switches intruding into door space which would interfere with the operation of neighboring active or moving parts, such as window pane movement in a window pane channel.

During door handle assembly installation, such "add-ons" increases the degree of difficulty of installation because each add-on must be separately installed after the door handle assembly is mounted in the door.

To provide a door handle assembly containing the "add-ons" suitable for use in many different models of vehicles yet meet the various door handle assembly space requirements, it is desirable to integrate the illuminated entry switch and the disarm switch into a modular assembly that mounts compactly to the door handle assembly. Also, it is desirable to employ a switch wiring arrangement which would reduce the number of wires associated with illuminated entry and the network for the security alarm system.

To obtain the above-mentioned desiderata, a search for various other means to turn on the illuminated entry interior lights using the door handle and to disarm the security alarm system using the key cylinder was initiated. This search resulted in the improved door handle assembly activation system of the present invention.

SUMMARY OF THE INVENTION

As a solution to these and other problems, the instant invention comprises a switch assembly that attaches to a door handle which provides: (1) switch signals for illuminating interior lights during transition of door handle from an "at rest" position to an "open" position; and (2) disarm signalling when a key cylinder of the door assembly is turned to an opened position.

A further embodiment includes an expanded switch assembly that provides a plurality of pushbutton control signals for operating optionally selected driver and control functions.

BRIEF DESCRIPTION OF THE DRAWING FIGURES

FIG. 5 is a front perspective view of a further embodiment of the switch assembly that includes external pushbutton switches for the door assembly.

FIG. 6 is a perspective view of one of the external pushbutton switches of FIG. 5.

FIG. 7 depicts a computer program used for controlling the operation of the further embodiment depicted in FIG. 5.

DETAILED DESCRIPTION OF A PREFERRED EMBODIMENT

Figure 1:
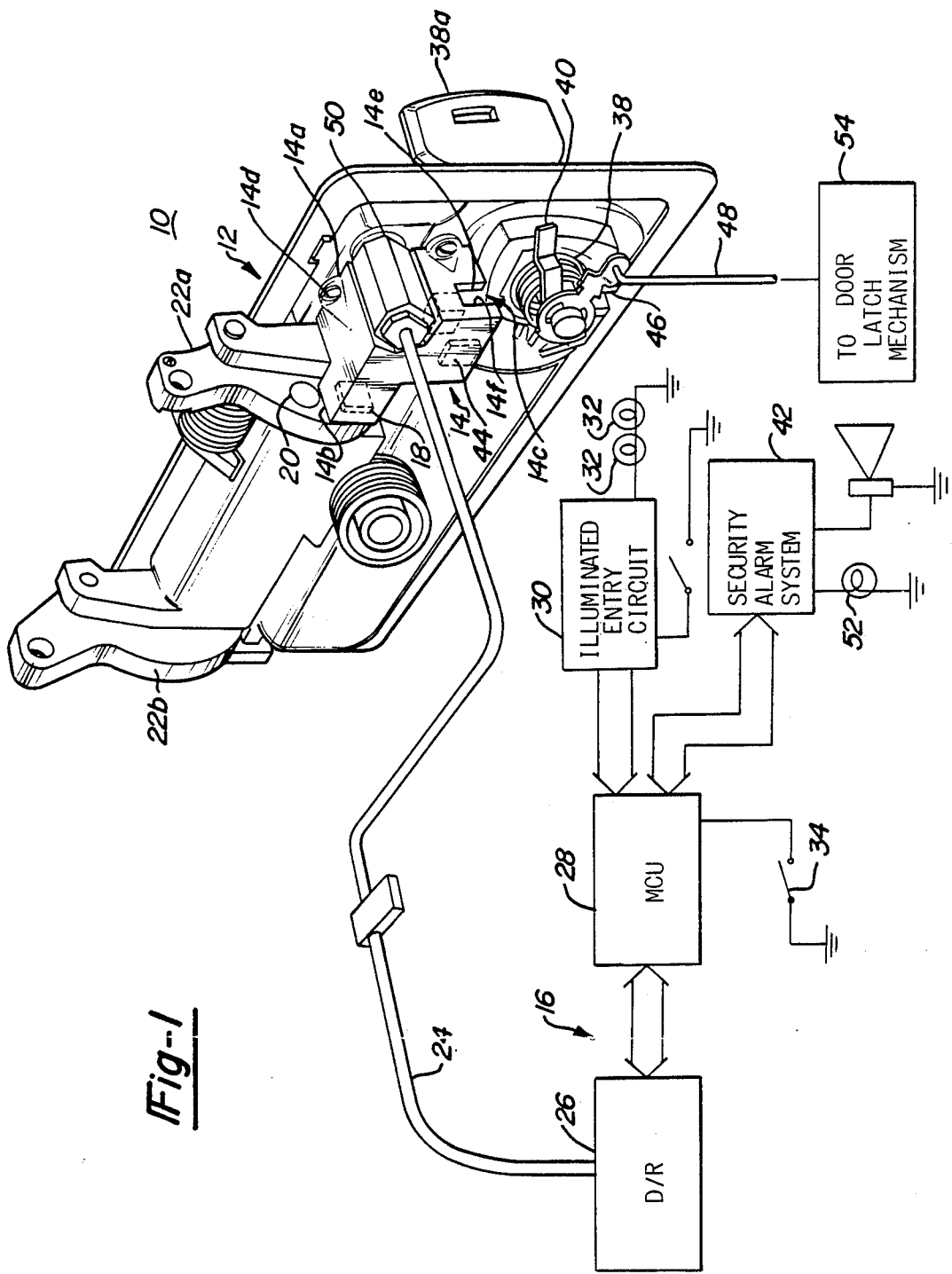
FIG. 1 is a rear perspective view of a door handle assembly at an "at rest" condition with a modular switch assembly of this invention mounted thereon and a block diagram of a single wire bus control system connected between the modular switch assembly and the illuminated entry interior lights and security alarm systems.

FIG. 1 depicts a door handle assembly system 10 which includes the door handle assembly 12, a modular switch assembly network 14 and a smart sensor single wire bus multiplex system 16.

Figure 2:
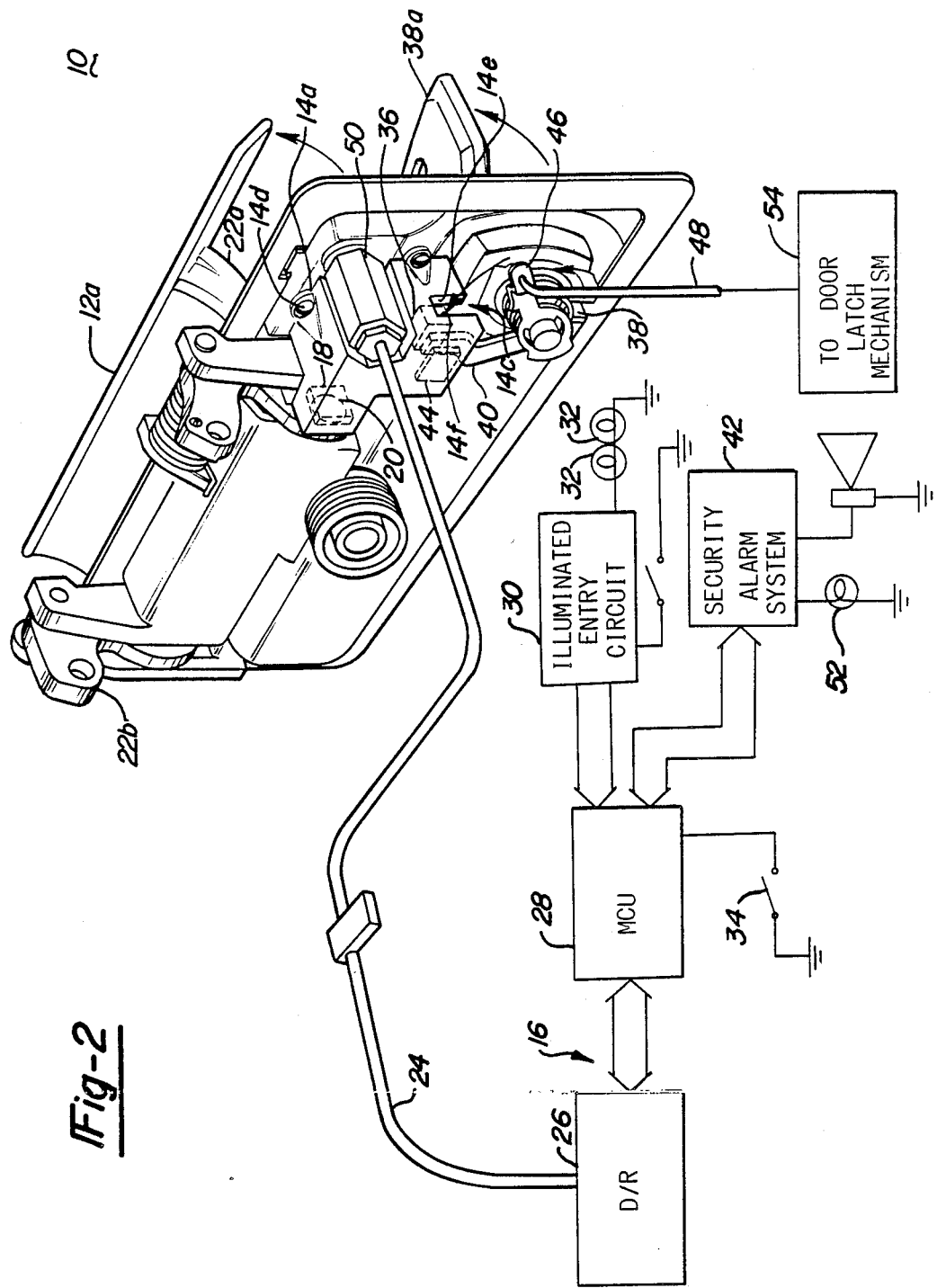
FIG. 2 depicts the assembly of FIG. 1 with the door handle positioned, to activate the illuminated entry switch and a key cylinder turned to activate the disarm switch of the modular switch assembly.

Network 14 includes an illuminated entry smart sensor 18 positioned to sense a permanent magnet 20 when a door handle 12a (best shown in FIG. 2) and a pair of pull levers 22a and 22b of assembly 12 move from a "rest" position (as depicted in FIG. 1) to a door latch release position (depicted in FIG. 2). During this transition of door handle 12a and the pair of pull levers 22a and 22b, the illuminated entry permanent magnet 20, arranged on pull lever 22a, provides a magnetic field about sensor 18 causing a sensing element such as a hall effect transistor contained in sensor 18 to switch on and to provide an electric current signal over a single wire bus 24 to a driver/receiver (D/R) unit 26 of multiplex system 16. Sensor 18 mounts on a face 14b of a non-metallic housing 14a of the modular switch assembly 14.

D/R 26 controlled by a microcomputer (MCU) 28 provides power and control signals to smart sensors connected to bus 24. The smart sensors include circuits for informing MCU 28 that the sensor is present (the status of the sensor) and whether or not the sensor has been switched ON or OFF (the state of the sensor). D/R 26 converts this information to logic level signals that MCU 28 can use.

MCU 28 uses the status and state of the sensor information to issue commands to an illuminated entry circuit 30 to cause illuminated entry lights 32—32 to light in response to movement of pull lever 22a. Specifically, D/R 26 sends a logic one signal to MCU 28. MCU 28 contains firmware which reads the logic one signal as an illuminated entry input signal. MCU 28 initiates a countdown counter (not shown) which outputs a control signal to the illuminated entry circuit 30 for, e.g., 45 seconds, causing the interior lights to come ON and remain ON until the counter counts down to zero.

Turning ignition switch 34 ON prior to the counter reaching zero causes the illuminated entry circuit to turn off the lights. This prevents the occurrence of, e.g., at night, driving with the interior lights on.

The operation of D/R 26 and MCU 28, in conjunction with sensors such as illuminated entry smart sensor 18, is described in Wroblewski, et al. U.S. Pat. No. 4,736,367 dated Apr. 5, 1988 and of the present assignee.

FIG. 1 also depicts, as part of assembly 14, a security alarm disarm smart sensor 36 fixedly mounted in a wall 14e of a slot 14c to sense rotation of a key cylinder 38 and to provide a disarm signal to a security alarm system 42 if system 42 has been previously armed.

A complementary disarm magnet 44 also fixedly mounted on another wall 14f of slot 14c in the housing 14a of assembly 14 provides a magnetic field about sensor 36 which causes a sensing element in sensor 36 to switch ON and to provide an electric current signal over the single wire bus 24 to D/R 26.

Turning a door key 38a in cylinder 38, as depicted in FIG. 2, causes an interrupter 40 to rotate and thereby blocking the magnetic field emanating from magnet 44. This action generates the disarm signal from sensor 36.

At the same time that interrupter 40 blocks the magnetic field of magnet 44, a latch lever 46 connected to a door latch linkage 48 causes a latch mechanism 54 to unlock the door.

Hence, FIG. 1 depicts the door latch lock arrangement while FIG. 2 depicts the door latch unlock and security alarm disarming arrangement.

A connector 50 of the modular switch assembly 14 provides a port on door handle assembly 12 for connecting the sensors to a common ground circuit and for forming a connection to single wire bus 24.

OPERATION OF THE SYSTEM

The initial conditions for operating system 10 find the ignition switch 34 in an OFF position and the sequence of steps needed to arm security alarm system 42 completed.

Operating door handle 12a will start the illuminated entry operation. Turning the door key to unlock in key cylinder 38 will disarm alarm system 42.

Figure 3:
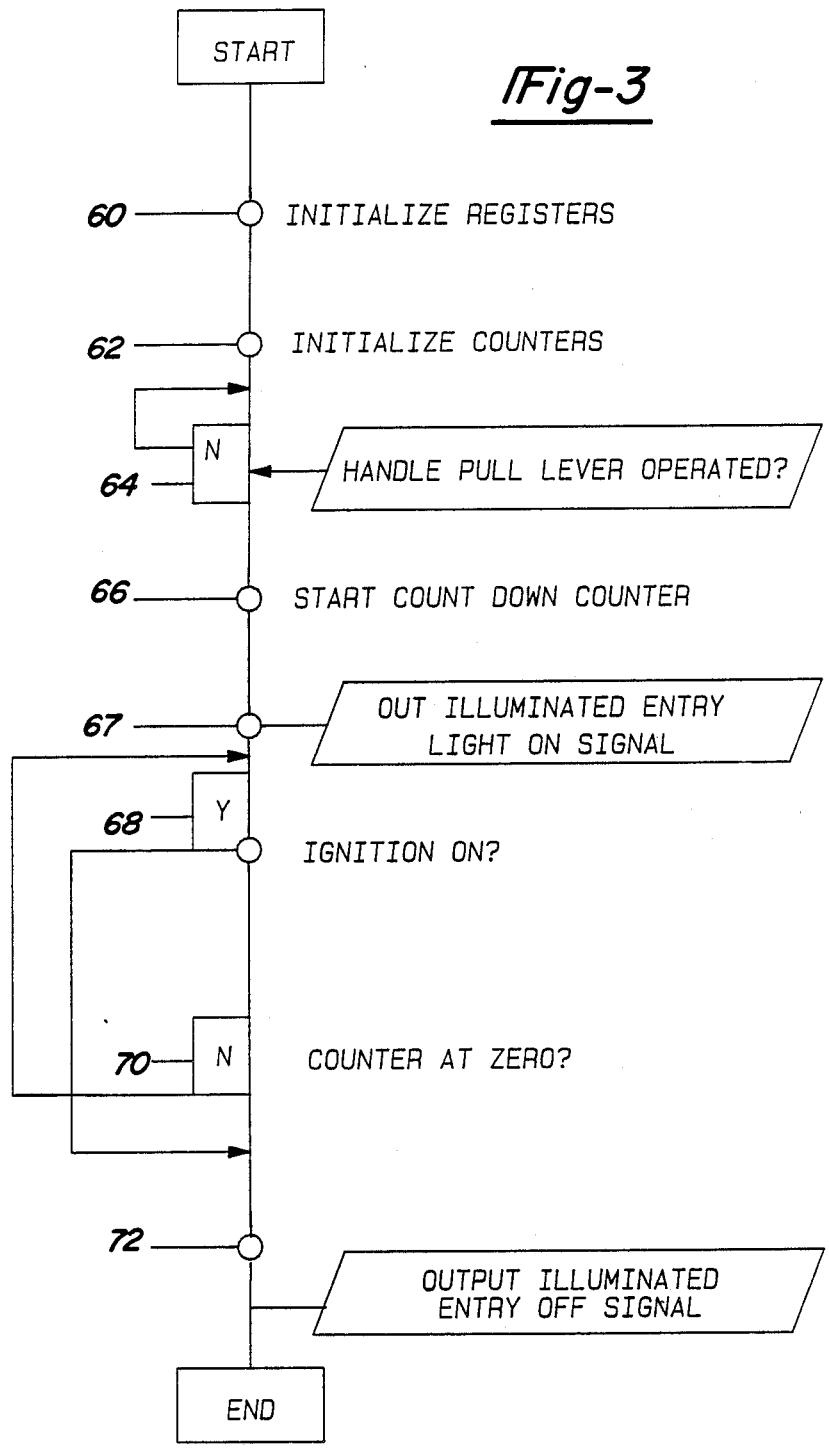
FIGS. 3 and 4 depict the computer programs used for controlling the control system of FIGS. 1 and 2.

To relate the operation of MCU 28 with D/R 26 and the illuminated entry circuit 30, refer to FIG. 3 which depicts a flowchart of the program executed by MCU 28.

Figure 4:
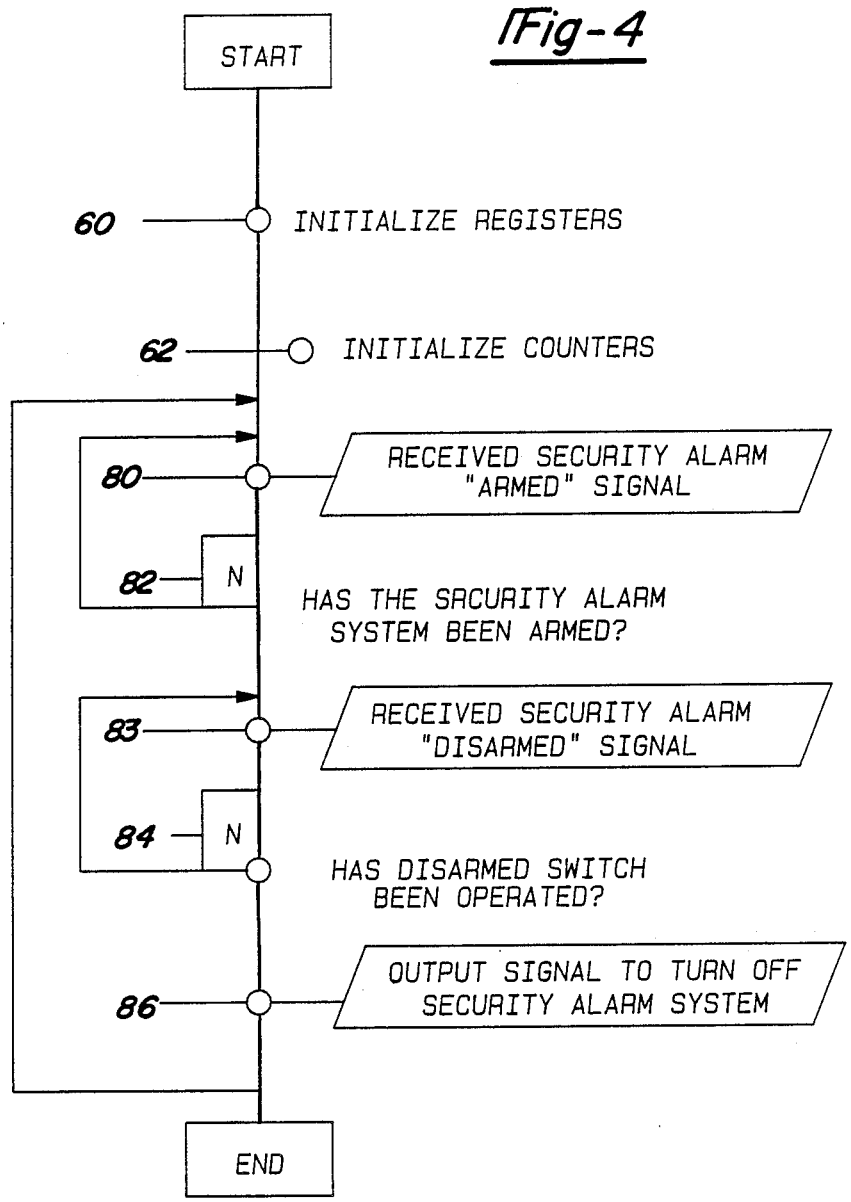

Before describing flowcharts, FIG. 3 and FIG. 4, some comments are in order.

Flowcharts 3 and 4 provide a description of the programs executed by MCU 28. In these diagrams, the flow of control passes along the lines and proceed down the page. Conventional start-up of the program and end-of-program elongated circle symbols are used. Actions are signified by a small circle or dot on the lines with the description of the action appearing to the left or right of the flow lines. Actions only take place on vertical lines. When a decision has to be introduced, the flow line branches to the right or left. The branch may be caused by either a YES or NO condition, this being signified by a Y or N in a box as indicated. Where secondary flow rejoins the main flow, an arrowhead is used. The conventional trapezoid is used to indicate input or output operations. A reference number indicates the point along the line being discussed.

Initially, with just battery power available, MCU 28 executes a start-up program which sets all registers of MCU 28 with correct values and clears all information in the computer memory to zero before accepting information from D/R 26. This is called initializing the registers (step 60).

Then MCU 28 initializes its internal sensor counters (step 62). Thereafter, MCU 28 looks for an indication from D/R 26.

MCU 28, as indicated at decision box 64, determines whether or not a signal from D/R 26 indicates that a door handle 12a has been operated, which would initiate an illuminated entry sequence. If the signal reveals that the handle was not operated, then MCU 28 continues to look for such a signal. If MCU 28 determines that the door handle has been operated, then MCU 28 triggers a count-down counter (step 66) which counts from, illustratively, 45 seconds down to zero. Upon triggering the counter, MCU 28 outputs a signal to illuminated entry circuit 30 of FIG. 2 to turn on the interior lights 32—32 (step 67).

While the count-down counter counts, MCU 28 is instructed to look at an input port which receives current signals from the ignition switch 34. As indicated at box 68, MCU 28 is instructed to make the decision as to whether or not ignition switch 34 is ON. If the switch is ON, indicating the operator has disarmed the security alarm system 42, then MCU 28 is instructed to issue an output signal that causes the illuminated entry circuit 30 to turn off the interior lights 32—32 (step 72).

If the ignition switch 34 is not ON, then MCU 28 waits for the count-down counter to time out.

MCU 28 makes a decision, as in box 70, as to whether or not the count-down counter has counted to zero. If not, MCU 28 keeps the illuminated entry signal outputted to circuit 30. If the counter counts down to zero, then MCU 28 issues a signal to the illuminated entry circuit 30 which causes the lights 30—30 to turn OFF (step 72).

Referring now to FIG. 4, this flowchart depicts the program executed by MCU 28 to provide for disarming the security alarm system 42.

After initialization, (steps 60 and 62) with the interrupter 40 of key cylinder 38 in an uninterrupting state (FIG. 1), D/R 26 provides a constant HIGH signal to MCU 28 (step 80).

To arm the security alarm system 42, illustratively, locking the driver or front passenger door without a key, will accomplish it (step 82).

If the operator turns the key in key cylinder 38 to disarm the security alarm system 42, MCU 28 makes a decision, as in step 84, as to whether or not a disarm signal (LOW) has been inputted (step 83). If no, MCU 28 continues to look for this signal. If it has received the disarmed signal, MCU 28 outputs a signal to the security alarm system 42 to turn it OFF (step 86).

Then MCU 28 loops back to step 80 to look for the next HIGH armed signal from the modular switch assembly 14.

ANOTHER EMBODIMENT

Referring now to FIG. 5, there is shown another embodiment of the door handle system which not only includes the modular switch assembly 14, but includes auxiliary switches 100—100 structured in a cavity 12b of door handle assembly 12 as depicted in FIG. 6 which provides auxiliary control signals to MCU 28. These switches 100—100 mount on the door handle assembly 12 and permit personalized controlling of other devices 43 such as motorized mirrors, seats, radio, and for locking glove compartment locks or even car door locks using signals placed on bus 24. This arrangement allows, illustratively, at least five control signals to be multiplexed over a single wire bus. This is in contrast to other door handle systems where individual wires are needed to route control signals to end devices.

The switch 100, as depicted in FIG. 6, includes a button 100A, a magnet 104 and a smart sensor 102 which couples to bus 24. When the button 100A of the switch 100 is pressed, the magnet 104 creates a magnet field on the face of sensor 102 causing sensor 102 to provide a signal over bus 22 that switch 100 has been activated. A mechanical stop 106 and a spring 108 controls movement of the magnet 104 in the direction of arrow A.

The magnets employed in system 10 may have a rating of between 200—280 gauss with a diameter of 2-4 mm which is about one and a half times the width of the smart sensor. The effective air gap between the sensor and magnet is between 3.54.5 mm.

To relate the program instructions of MCU 28 with the operation of keys 100—100 of the keypad, refer to the flowchart of FIG. 7. As in the previous flowchart, MCU 28 is instructed to initialize the registers and counters (steps 60 and 62). Then the program instructs MCU 28 to read the status of the input signals from D/R 26.

After reading the signals from D/R 26, MCU 28 is instructed to determine whether or not the signals from D/R 26 indicate that the keypad has been used (step 122). If not, the input signals from D/R 26 are again read. If the keypad has been used, then MCU 28 receives instructions to decipher the keypad entry to determine which end-use control device is being addressed from the keypad (step 124). Then MCU 28 is instructed to decipher the keypad entry to determine what function is to be performed by the end-use control device (step 126).

Then MCU 28 is instructed to decrement an appropriate control counter found in RAM (step 128). Afterward, MCU 28 is instructed to determine if the counter has counted down to zero (step 130). If not, the counter is allowed to continue to countdown (return to step 128) if the counter has counted down. Then MCU 28 is instructed to output a logic control signal to the appropriate control device to cause that device to perform the function entered into the keypad (step 132).

MCU 28, in system 10 illustratively, is a single chip, 8-bit unit such as Motorola ML68701 microcomputer chip, containing a CPU, on-chip clock, ROM, RAM, 1/0 lines and a timer.

While the present invention has been disclosed in connection with the preferred embodiment thereof, it should be understood that there may be other embodiments which fall within the spirit and scope of the invention and that the invention is susceptible to modification, variation and change without departing from the proper scope or fair meaning of the following claims.

We claim:

1. A combination illuminated entry and door lock switch for a vehicle door lock assembly that provides switch signals indicative of operating a door handle for turning on interior lights via an illuminated entry control system of a vehicle and a key cylinder switch that provides an indication of key cylinder operation for disarming a security alarm system incorporated in the vehicle, said system comprising:

(a) a pair of pull levers of the door handle for opening an unlocked vehicle door when the door handle moves from a rest position to a door-unlocked, operated position, a first lever of said pair of levers having a magnet disposed thereon for forming a first magnetic field at a chosen region of said first lever;

(b) a lock cylinder of the door lock assembly for unlocking the door of the vehicle in response to rotation of a door lock key within said cylinder, said cylinder having magnetic field interruption means disposed to pivot about said cylinder as the door lock key rotates in said cylinder from a lock to an unlock position;

(c) a non-metallic housing formed to mount to the door handle assembly having a first face of the housing juxtaposed to said first lever and having a slot formed therein to encompass said magnetic interruption means when the lock cylinder rotates to the unlock position, said slot having a first surface; said first surface having another magnet disposed therein for forming a second magnetic field at a chosen region within said slot;

(d) a first smart sensor means disposed in the first face of said housing having a sensing surface positioned to detect the magnetic field of the magnet disposed on said first lever of said door handle and to produce therefrom, at an output terminal, a voltage signal indicative of sensing the magnetic field when said door handle moves from the rest position to the door-unlocked operated position;

(e) a second smart sensor means disposed on a surface within said slot of said housing having a sensing surface positioned to sense the magnetic field from said another magnet when said door lock cylinder is in a lock position and to detect an interruption of the magnetic field when the interruption means enters the slot in response to the key being rotated to the unlocked position, said second sensor means producing therefrom a voltage signal indicative of the interruption of the magnetic field of said another magnet;

(f) single wire bus control means coupled to receive the voltage signals from said first and second smart sensor means via a single wire bus and producing therefrom, at output terminals, control signals multiplexed to the illuminated entry and security alarm systems to turn on the interior lights and to disarm the security alarm system, respectively.

2. Apparatus in accordance with claim 1 wherein said non-metallic housing is fixedly attached to the door handle assembly by means of attachment bolts.

3. Apparatus in accordance with claim 2 wherein said first and second smart sensor means have a first terminal coupled to the single-wire bus and a second terminal connected to a ground terminal.

4. Apparatus in accordance with claim 3 wherein said single wire control system is remote from said door handle assembly and wherein said control system couples to said first and second smart sensor means by means of the single wire bus.

5. Apparatus in accordance with claim 4 wherein said combination illuminated entry and door lock switch for the vehicle door lock assembly includes the first lever of said pair of levers, said non-metallic housing with said first and second smart sensor means disposed therein and said interrupter means disposed to pivot about said cylinder as the door lock key rotates.

6. A combination illuminated entry and door lock switch with a keyboard extension for a vehicle door lock assembly that provides switch signals indicative of operating a door handle for turning on interior lights via an illuminated entry control system of a vehicle and a key cylinder switch that provides an indication of key cylinder operation for disarming a security alarm system incorporated in the vehicle, and a keyboard extension that provides a plurality of keyboard signals for activating a plurality of control devices within the vehicle, said system comprising:

(a) a pair of pull levers of the door handle for opening an unlocked vehicle door when the door handle moves from a rest position to a door-unlocked, operated position, a first lever of said pair of levers having a magnet disposed thereon for forming a first magnetic field at a chosen region of said first lever;

(b) a lock cylinder of the door lock assembly for unlocking the door of the vehicle in response to rotation of a door lock key within said cylinder, said cylinder having magnetic field interruption means disposed to pivot about said cylinder as the door lock key rotates in said cylinder from a lock position to an unlock position;

(c) a non metallic housing formed to mount to the door lock assembly having a first face of the housing juxtaposed to said first lever and having a slot formed therein to encompass said magnetic interruption means when the lock cylinder rotates to the unlock position, said slot having a first surface; said first surface having another magnet disposed therein for forming a second magnetic field at a chosen region within said slot;

(d) a first smart sensor means disposed in the first face of said housing having a sensing surface positioned to detect the magnetic field of the magnet disposed on said first lever of said door handle and to produce therefrom, at an output terminal, a voltage signal indicative of sensing the magnetic field when said door handle moves from the rest position to the door-unlocked operated position;

(e) a second smart sensor means disposed on a surface within said slot of said housing having a sensing surface positioned to sense the magnetic field from said another magnet when said door lock cylinder is in a lock position and to detect an interruption of the magnetic field when the interruption means enters the slot in response to the key being rotated to the unlocked position, said second sensor means producing therefrom, at an output terminal, a voltage signal indicative of the interruption of the magnetic field of said another magnet;

(f) a keyboard means formed of a plurality of switches arranged in a row within a cavity of the door handle assembly arranged below the door handle and out of the path of the pair of door handle levers for providing voltage signals over a single line to an output terminal in response to a combination of switches pressed by the operator, wherein each of said plurality of switches contains a pushbutton having a magnet disposed in a plane opposite from a face of the pushbutton, wherein each of said magnets being spaced apart a chosen distance from a smart sensor so that the magnetic field of the magnet is not sensed by the spaced apart sensor when the face of the pushbutton is not pressed, wherein each of said magnets creating a magnetic field sensed by the smart sensor when the face of each pushbutton is pressed and wherein an output terminal of each of the smart sensors of the keyboard means couple to the single wire within said keyboard means;

(g) a single wire coupling means coupling the single wire of the keyboard means to the output terminal of the combination illuminated entry and door lock switch; and (h) single wire bus control means coupled to receive the voltage signals from the output terminals of said first and second smart sensors and said keyboard means via a single wire bus and producing therefrom, at output terminals, control signals multiplexed to the illuminated entry and security alarm systems to turn on the interior lights and to disarm the security alarm system, respectively, and to a plurality of other control devices that relate to the pushbuttons of said keyboard means.

* * * * *